United States Patent
Horvath et al.

(10) Patent No.: US 9,407,573 B2
(45) Date of Patent: Aug. 2, 2016

(54) BANDWIDTH CONTROL IN A CONTROLLER AREA NETWORK (CAN)

(71) Applicant: Mentor Graphics Corporation, Wilsonville, OR (US)

(72) Inventors: Istvan Horvath, Torslanda (SE); Zoltan Matyas, Budapest (HU)

(73) Assignee: Mentor Graphics Corporation, Wilsonville, OR (US)

( * ) Notice: Subject to any disclaimer, the term of this patent is extended or adjusted under 35 U.S.C. 154(b) by 273 days.

(21) Appl. No.: 14/013,959

(22) Filed: Aug. 29, 2013

(65) Prior Publication Data
US 2015/0063371 A1    Mar. 5, 2015

(51) Int. Cl.
*H04L 12/911* (2013.01)
*H04L 12/40* (2006.01)
*H04L 12/875* (2013.01)
*H04L 12/927* (2013.01)

(52) U.S. Cl.
CPC .............. *H04L 47/826* (2013.01); *H04L 12/40* (2013.01); *H04L 47/56* (2013.01); *H04L 47/805* (2013.01); *H04L 2012/40215* (2013.01)

(58) Field of Classification Search
None
See application file for complete search history.

(56) References Cited

U.S. PATENT DOCUMENTS

| 6,570,883 | B1 * | 5/2003 | Wong ............................. 370/412 |
| 6,973,067 | B1 * | 12/2005 | Haartsen ........................ 370/337 |
| 2004/0261101 | A1 * | 12/2004 | Iwamura ........................... 725/32 |
| 2006/0120282 | A1 * | 6/2006 | Carlson ............... H04L 12/2602 370/229 |
| 2009/0003306 | A1 * | 1/2009 | Plutov et al. .................. 370/348 |
| 2014/0281088 | A1 * | 9/2014 | VanderLeest et al. ........ 710/264 |

OTHER PUBLICATIONS

Kneuppel et al "Standardization of CAN networks for airborne use through ARINC 825" Mar. 13, 2012.*

* cited by examiner

*Primary Examiner* — Robert M Morlan
(74) *Attorney, Agent, or Firm* — Mentor Graphics Corporation

(57) ABSTRACT

This application discloses a controller area network (CAN) design and verification tool to identify periodic messages and sporadic messages that a control node is configured to transmit on a shared bus in a CAN design. The CAN design and verification tool can assign placeholders to a schedule table of the control node to define a message transmission schedule for the control node. The placeholders include at least one sporadic message placeholder configured to identify one of a plurality of minor time frames available on the shared bus for the control node to transmit any one of the sporadic messages. The CAN design and verification tool can determine a worst-case latency associated with delivery of a first one of the sporadic messages on the shared bus when the control node utilized the sporadic message placeholder to transmit a second one of the sporadic messages on the shared bus.

20 Claims, 9 Drawing Sheets

BANDWIDTH CONTROL IN A CONTROLLER AREA NETWORK (CAN)

TECHNICAL FIELD

This application is generally related to a controller area network (CAN) and, more specifically, to bandwidth control in the controller area network.

BACKGROUND

A controller area network (CAN) standard defines a message-based protocol that can be utilized to transmit and receive messages between multiple control nodes over a shared bus. This technology is widely utilized in the automotive and aerospace industries to transmit messages through vehicles and airplanes, for example, communicating sensory input or device states between various control nodes over the bus.

The control nodes with messages to send can arbitrate utilization of the bus based on an identification field in the messages, as a value in the identification field can both identify the message and indicate a priority of the message. During arbitration, control nodes can begin transmitting their corresponding message on the bus during a transmission period and listen to the bus to determine whether the identification field of their message was overwritten by a message from a competing control node. If the identification field of their message was not overwritten, the control node has control over the bus and can continue to transmit the message. When the identification field of their message is overwritten, however, the control node loses bus arbitration to another control node with a dominant priority annunciated by the identification field in the message.

Since the controller area network allows for distributed controller-based arbitration, the controller area network can experience long worst-case latencies for messages blocked from accessing the bus by other, higher-priority messages. In an effort to make a controller area network deterministic, i.e., ensuring every message can be delivered through the controller area network by their respective deadlines, a new standard was promulgated by Aeronautical Radio, Incorporated (ARINC), called ARINC 825, which defines a specification that pre-schedules each message capable of being transmitted over the bus into various time slots of a static schedule table. Since each time slot can correspond a time period large enough for the bus to accommodate multiple message transmissions, multiple control nodes can pre-schedule one or more messages to each time slot of their corresponding static schedule table. To help ensure every message pre-scheduled to a time slot can gain access to the bus during that time slot, the ARINC 825 standard also places a limitation bus load of no more than 50% utilization.

As controller area networks become more sophisticated, however, the ability for system designers to identify or define a static schedule table for each control node that complies with the bus load and other constraints of ARINC 825 is challenging and time-consuming. When pre-scheduling every message becomes difficult, system designers often alter system specifications, such as bus speed, time slot duration, or the like, or alter a number of messages capable of transmission, number of control nodes in the controller area network, or the like, which intentionally under-utilizes system resources in order to meet the ARINC 825 standard.

SUMMARY

This application discloses tools and mechanisms for scheduling message transmission in a controller area network (CAN) design that can satisfy ARINC 825 standard, while utilizing shared placeholders for sporadic messages. The tools and mechanisms also can determine a worst-case latency for sporadic messages utilizing the shared placeholders. According to various embodiments, the tools and mechanisms can identify periodic messages and sporadic messages that a control node is configured to transmit on a shared bus in a CAN design. The tools and mechanisms can assign placeholders to a schedule table of the control node to define a message transmission schedule for the control node. The placeholders include at least one sporadic message placeholder configured to identify one of a plurality of minor time frames available on the shared bus for the control node to transmit one of a plurality of the sporadic messages. The tools and mechanisms can determine a worst-case latency associated with delivery of a first one of the sporadic messages on the shared bus when the control node utilized the sporadic message placeholder to transmit a second one of the sporadic messages on the shared bus.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the invention.

Figure 1:
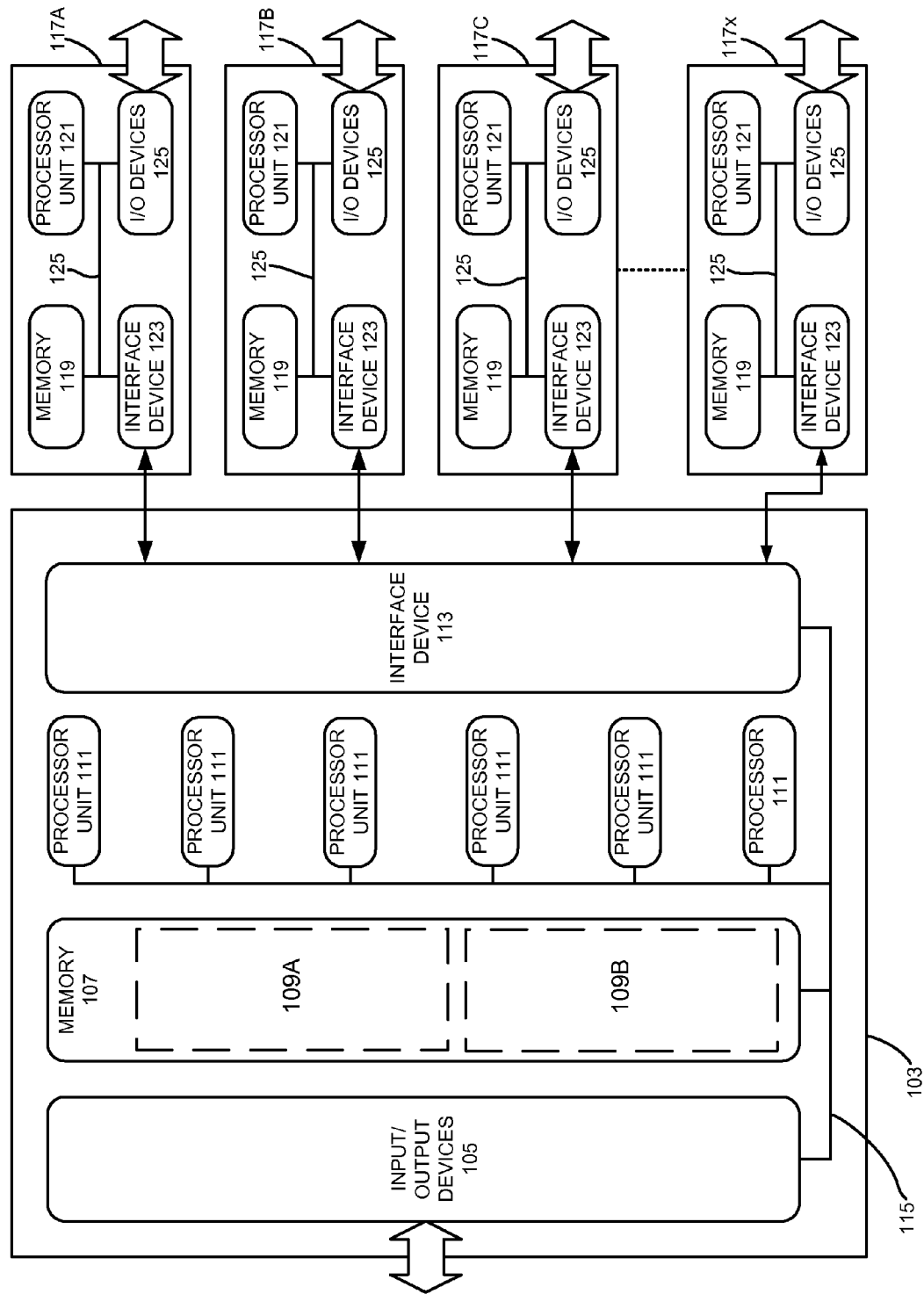
FIGS. 1 and 2 illustrate an example of a computer system of the type that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
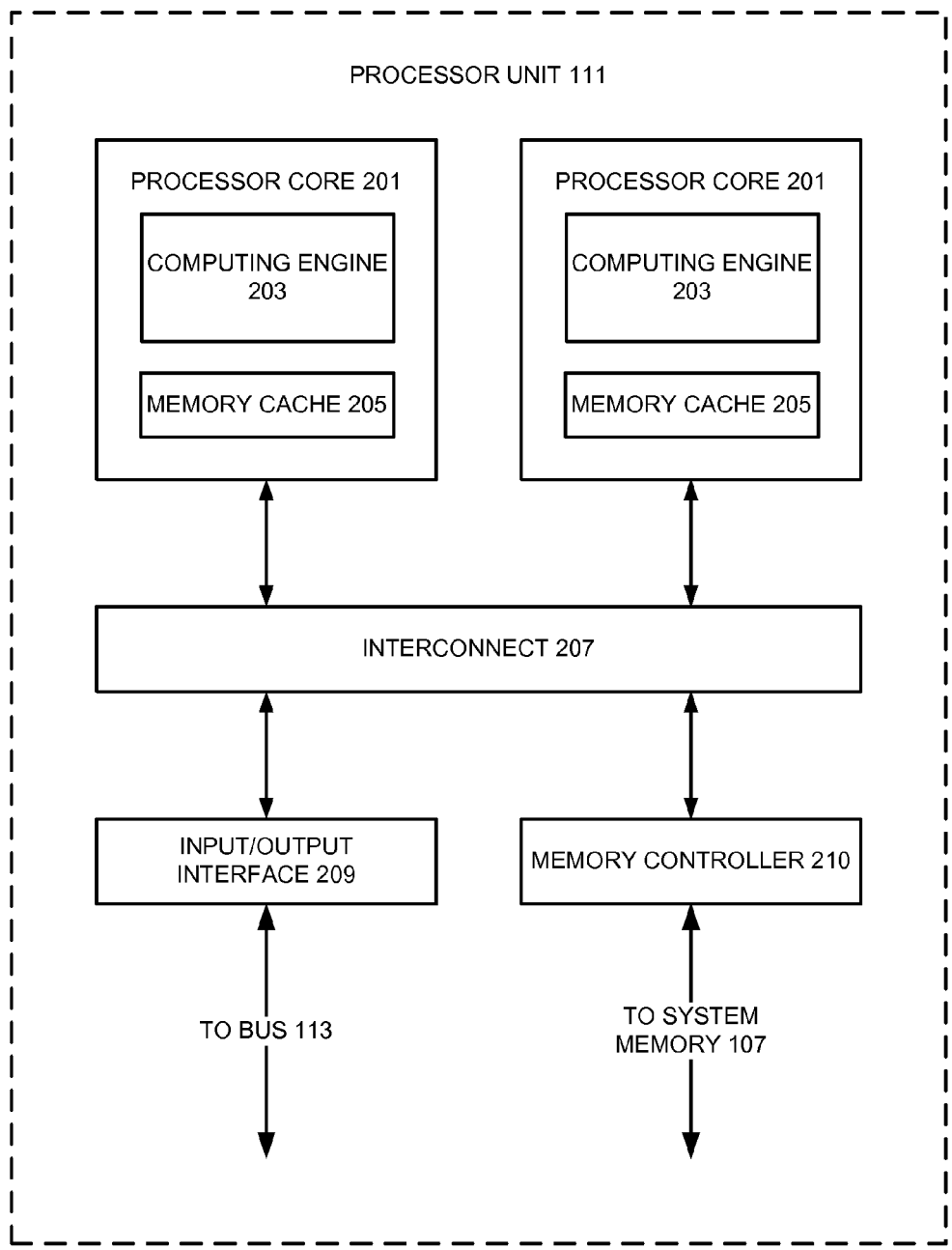

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 428×428 bit registers, four single-precision floating point computational units, four integer computational units, and a 556 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Illustrative Controller Area Network (CAN) Design

Figure 3:
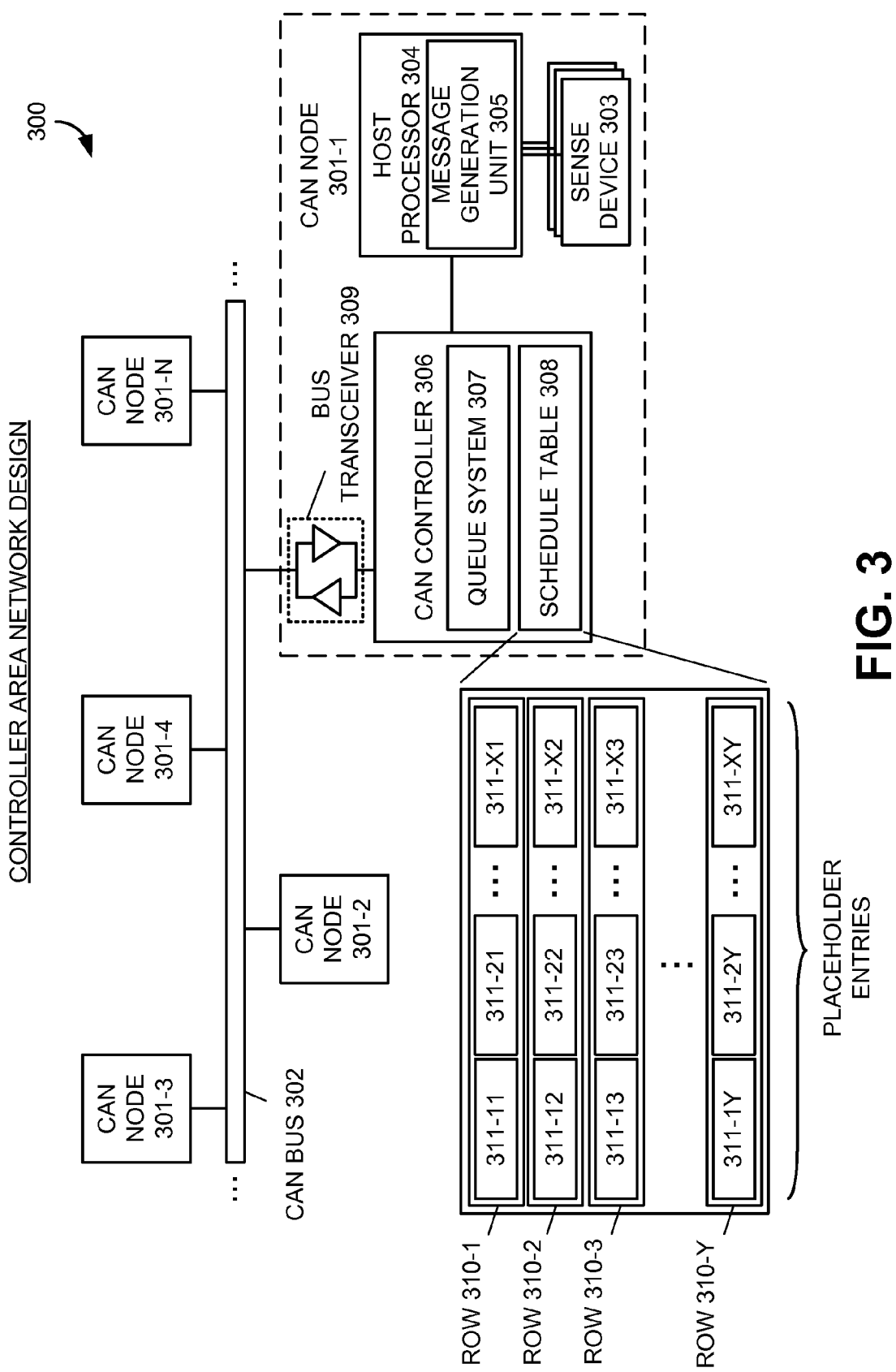
FIG. 3 illustrates an example controller area network (CAN) design according to various embodiments of the invention.

FIG. 3 illustrates an example controller area network design 300 according to various embodiments of the invention. Referring to FIG. 3, a controller area network design 300 can model a controller area network, for example, coded as a netlist or coded in a hardware description language (HDL), such as Verilog, Very high speed integrated circuit Hardware Design Language (VHDL), or the like. The controller area network design 300 can include multiple CAN nodes 301-1 to 301-N coupled to exchange messages over a CAN bus 302 in a serial-fashion according to a message-based protocol, for example, as defined by a controller area network standard.

Transmissions on the CAN bus 302 can be divided into multiple different predefined time periods, called minor time frames. Each of these minor time frames can accommodate transmission of multiple messages, for example, one or more messages transmitted by each CAN node 301-1 to 301-N in the controller area network. In some embodiments, the duration of the minor time frame can be set in the controller area network design 300 based, at least in part, on message delivery deadlines, a number of CAN nodes 301-1 to 301-N in the controller area network design 300, and/or a transmission speed on the CAN bus 302. For example, an upper bound for the duration of the minor time frame can be defined based on a shortest message delivery deadline, while a lower bound for the duration of the minor time frame can correspond to a transmission time for a minimum number of messages the CAN nodes 301-1 to 301-N during any of the minor time frames. For example, when the controller area network design 300 specifies that each CAN node 301-1 to 301-N transmits at least one message in each minor time frame, the lower bound for the duration of the minor time frame can correspond to twice the number of CAN nodes 301-1 to 301-N in the controller area network design 300 multiplied by a message length and divided by the transmission speed on the CAN bus 302. In some embodiments, the lower bound of the duration of the minor time frame can correspond to the time period in which all periodic frames, or a predetermined sub-set of all periodic frames, are transmitted at least once.

Since the CAN bus 302 is a shared system resource, the CAN nodes 301-1 to 301-N can arbitrate for access to the CAN bus 302 with their corresponding messages. In some embodiments, the messages can include identification fields, which can provide an identification of the messages as well as indicate priorities of the messages. For example, when the CAN node 301-1 has a message to transmit over the CAN bus 302, the CAN node 301-1 can begin transmitting the identification field of the message on the CAN bus 302 and listen to the CAN bus 302 to determine whether identification field in the message was overwritten, indicating another one of the CAN nodes 301-2 to 301-N transmitted a different message on the CAN bus 302 having a higher priority level. If the identification field of the message was not overwritten, the CAN node 301-1 has control over the CAN bus 302 and can continue to transmit the message. When the identification field of the message was overwritten, however, the CAN node 301-1 lost bus arbitration to the message having an identification field with the higher priority level.

Given the uncertainty of when a message can gain access to the CAN bus 302 due to the distributed arbitration by the CAN nodes 301-1 to 301-N, an Aeronautical Radio, Incorporated (ARINC) group promulgated an extension to the controller area network standard, called ARINC 825, which defines a bandwidth control scheme for controller area networks. The ARINC 825 standard calls for pre-scheduling all message transmissions that could occur over the CAN bus 302 by each of the CAN nodes 301-1 to 301-N, for example, by reserving bandwidth in minor time frames for transmission of messages from the CAN nodes 301-1 to 301-N. To help ensure that all messages scheduled into a minor time frame gain access to the CAN bus 302 during the minor time frame regardless of priority, the ARINC 825 standard sets certain limitations on the controller area network, for example, limiting bandwidth utilization of the CAN bus 302 to less than 50%, setting a maximum number of messages that can be transmitted by any CAN node 301-1 to 301-N in any minor time frame, setting a common duration of the minor time frame for each CAN node 301-1 to 301-N, and the like. These limitations imposed by the ARINC 825 standard can ensure that each message can be transmitted on the CAN bus 302 with maximum arbitration delay, for example, corresponding to 50% of the minor time frame, independent of message priority and independent of whether minor time frames for different CAN nodes 301-1 to 301-N are synchronized. Embodiments of ARINC 825 standard implementation by the CAN nodes 301-1 to 301-N will be described below in greater detail.

The CAN node 301-1 can include a host processor 304 having a message generation unit 305 to generate messages for transmission over the CAN bus 302, for example, in response to input from one or more sense devices 303. The sense devices 303 can be sensors, actuators, or other control devices internal or external to the CAN node 301-1, which can generate the input for the CAN node 301-1 based on external conditions or activities. For example, one of the sense devices 303 can be a sensor, such as a tire pressure sensor, temperature sensor, or any other type of sensor, which can generate input based on a sensed external condition. When one of the sense devices 303 is an actuator, such as a button, switch, multi-state device, or the like, the sense device 303 can generate input based on a current state of the actuator or in response to a change of state in the actuator.

The message generation unit 305 can generate different types of messages, such as periodic messages and sporadic messages. The periodic messages can be messages having periodic delivery times through the controller area network, messages that can be periodically transmitted, messages that can be periodically-generated, or the like. The sporadic messages can be messages having generation, transmission, delivery times, or the like, which can be irregular, infrequent, random, or non-periodic. For example, the message generation unit 305 can generate a sporadic message in response to input from a sense device 303, such as a user activation of a button or switch. In some examples, the message generation unit 305 can generate periodic messages in response to sensor input, such as a temperature measurement, tire pressure measurement, or the like.

The CAN node 301-1 can include a CAN controller 306 to receive the messages generated by the host processor 304 and present the messages to the CAN bus 302 for transmission via a bus transceiver 309. The CAN controller 306 can receive messages from other CAN nodes 302-2 to 302-N over the CAN bus 302 via the bus transceiver 309, and forward the messages to the host processor 304 for processing.

The CAN controller 306 can include a queuing system 307 to hold messages awaiting transmission over the CAN bus 302. The sequence of when the CAN controller 306 presents the messages held by the queuing system 307 to the CAN bus 302 for transmission can be based, at least in part, on a schedule table 308, for example, formed in accordance with the ARINC 825 standard. In some embodiments, the schedule table 308 can include multiple rows 310-1 to 310-Y, each of which can be correlated to different sequential minor time frames on the CAN bus 302. For example, the row 310-1 can correspond to a first minor time frame on the CAN bus 302, the row 310-2 can correspond to a second minor time frame on the CAN bus 302 adjacent to and sequentially after the first minor time frame, and so on. The rows 310-1 to 310-Y include placeholder entries 311-11 to 311-XY corresponding to a reservation of bandwidth in the corresponding minor time frames on the CAN bus 302 for messages that the CAN node 301-1 identified by the der entries 311-11 to 311-XY.

During operation, the CAN controller 306 can utilize the rows 310-1 to 310-Y and corresponding placeholder entries 311-11 to 311-XY in the rows 310-1 to 310-Y to determine which messages to transmit and when to transmit those messages on the CAN bus 302. For example, the CAN controller 306 can identify which of the rows 310-1 to 310-Y in the schedule table 308 corresponds to a current minor time frame on the CAN bus 302, locate placeholder entries 311-11 to 311-XY present in the identified one of the rows 310-1 310-Y, determine an identification of messages corresponding to the located placeholder entries 311-11 to 311-X1, and, if the identified messages are stored in the queue system 307, present them to the CAN bus 302 for transmission during the current minor time frame.

In some embodiments, one or more of the placeholder entries can be periodic placeholders, each configured to identify one particular periodic message. Since some controller area network designs include many sporadic messages, which may or may not arrive at the queue system 307, in some embodiments, one or more of the placeholder entries can be generic sporadic placeholders configured to identify more than one sporadic message. For example, the generic sporadic placeholders can correspond to any or all the sporadic messages CAN node 301-1 could possibly transmit over the CAN bus 302, identify a subset of the possible sporadic messages, or the like. In some embodiments, the CAN controller 306, in response to determining one of the placeholder entries is a generic sporadic placeholders, can present any sporadic message stored in the queue system 307 to the CAN bus 302 for transmission.

The CAN controller 306 can sequentially progress through the rows 310-1 to 310-Y of the schedule table 308 with each successive minor time frame. After utilization of the last row 310-Y in the schedule table 308, the CAN controller 306 can wrap around the schedule table 308 to sequentially correlate the first row 310-1 to a next minor time frame. The configuration of the schedule table 308 and the execution of the rows 310-1 to 310-Y by the CAN controller 306 can allow each row 310-1 to 310-Y to be correlated to multiple different minor time frames on the CAN bus 302, for example, temporally separated with a periodicity corresponding to the number of rows in the schedule table 308.

The CAN controller 306 can determine when the CAN node 301-1 gains access to the CAN bus 302 to transmit a particular message. For example, when transmitting the identification field of a message, the CAN controller 306 can listen to the CAN bus 302 via the bus transceiver 309 to identify whether the identification field of the message was overwritten on the CAN bus 302, which indicate whether the CAN controller 306 continues or ceases transmitting the message based on whether the identification field of the message was overwritten on the CAN bus 302. Each CAN node 301-2 to 301-N can include electrical components similar to those of the CAN node 301-1 shown in FIG. 3—the specific instances of those electrical components, however, can be implemented variously in the controller area network design 300.

Controller Area Network Design Tool

Figure 4:
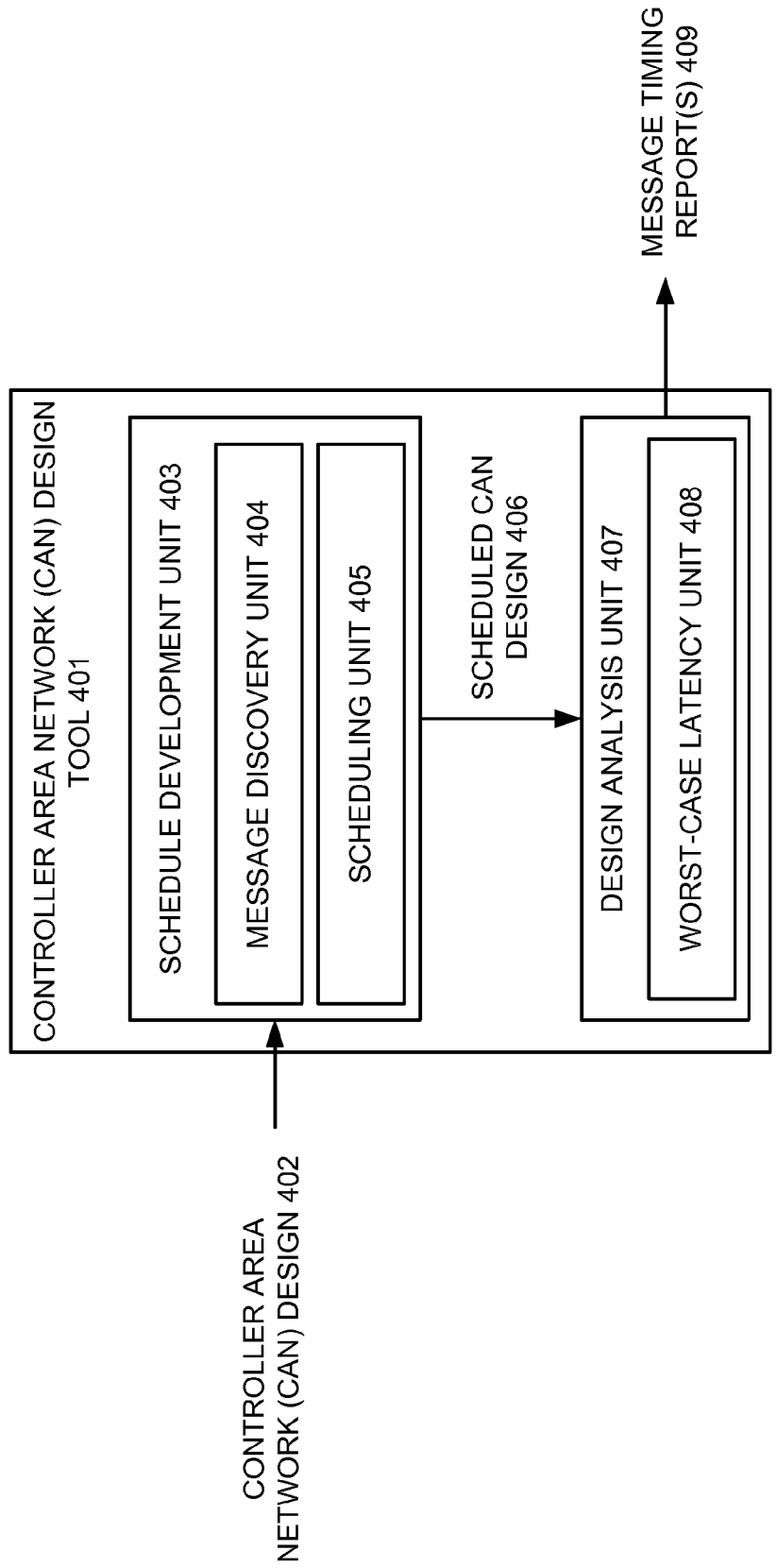
FIG. 4 illustrates an example of a controller area network design tool including a scheduling unit and a worst-case latency unit that may be implemented according to various embodiments of the invention.

FIG. 4 illustrates an example of a controller area network design tool 401 including a scheduling unit 403 and a worst-case latency unit 408 that may be implemented according to various embodiments of the invention. Although FIG. 4 shows the schedule development unit 403 and the worst-case latency unit 408 included in a common tool, i.e., the controller area network design tool 401, in some embodiments, the schedule development unit 403 and the worst-case latency unit 408 can be located in different tools. Referring to FIG. 4, the controller area network design tool 401 can receive a controller area network design 402, which can describe components and operations of a controller area network. In some embodiments, the controller area network design 402 can be similar to the controller area network design 300 discussed above in FIG. 3.

The controller area network design 402 can include parameters of the controller area network, such as an identification of CAN nodes in the controller area network design 402, or the like. The controller area network design 402 can include parameters of the controller area network, such as an identification of messages available to be transmitted by each CAN node over the CAN bus in the controller area network design 402, for example, including information regarding the priority of the messages that can be sent from each CAN node, whether the messages are periodic or sporadic, message delivery timing, periodicity of periodic messages, minimum regeneration time for sporadic messages, or the like. The controller area network design 402 can include parameters of the controller area network, such as an identification of the operation of the CAN bus, i.e., a frame period, a frame transmission time, minor time frame duration, or the like.

The controller area network design tool 401 can include schedule development unit 403 to develop schedule for presentation of messages to a CAN bus in the controller area network design 402. The schedule development unit 403 can include a message discovery unit 404 to determine which messages each CAN node can transmit over the CAN bus in the controller area network design 402, and the parameters for each of those messages. For example, the message parameters can include the length of the messages, the delivery timing for the messages, whether the messages are periodic messages or sporadic messages, the periodicity for the periodic messages, the regeneration time of the sporadic messages, the priority of the messages, or the like.

The schedule development unit 403 can include a scheduling unit 405 to utilize the messages and message parameters determined by the message discovery unit 404 to populate schedule tables in the CAN nodes with placeholder entries and generate a scheduled CAN design 406. The placeholder entries can reserve bandwidth on the CAN bus for messages, for example, regardless of whether the CAN nodes utilize the bandwidth reservation to transmit a message. In some embodiments, the scheduling unit 405 can utilize generic sporadic placeholder entries to schedule transmission of sporadic messages in the controller area network design 402. The CAN nodes, during operation, can present messages to the CAN bus in the controller area network design 402 based on the configuration of their corresponding schedule tables.

The controller area network design tool 401 can include a design analysis unit 407 to analyze the controller area network modeled in the scheduled CAN design 406 and generate a message timing report 409 for the controller area network design 502. The message timing report 409 can identify timing metrics for messages transmitted over the CAN bus in the controller area network during analysis of the scheduled controller area network design 406.

The design analysis unit 407 can include a worst-case latency unit 408 to determine a worst-case latency for delivery of one or more target messages through the controller area network during analysis of the scheduled controller area network design 406. The worst-case latency for a target message delivered through the controller area network can include several different delay time intervals including a generation delay, a queuing delay, a transmission delay, and a delivery delay. The generation delay can correspond to a time taken to generate of the target message, for example, between the detection of an event by a sense device until the target message is generated and provided to a CAN controller for transmission to a destination CAN node over the CAN bus. The queuing delay can correspond to a time taken for the target message to gain access to the shared bus, which can include both a time for the CAN controller to select the target message for presentation to the CAN bus and an arbitration time before the target message gains access to the CAN bus. The transmission delay can correspond to a time taken for the target message to transmit on the shared bus to the destination CAN node. The delivery delay can correspond to a time taken for the destination CAN node to process the target message and deliver the target message to a destination endpoint device.

Previously, the worst-case latency calculations in the ARINC 825 standard included a queuing delay that assumed all messages scheduled for a minor time frame would be able to gain access to the CAN bus during the minor time frame with no less than 50% arbitration delay regardless of priority. Since the scheduled controller area network design 406 can include generic sporadic placeholders, rather than separate placeholder entries for each sporadic message, the possibility exists that some sporadic messages may be delivered in subsequent minor time frames. The worst-case latency unit 408 can determine whether a CAN node can have more sporadic messages to send than available generic sporadic placeholders, i.e., indicating at least one sporadic message can have a queuing delay that extends past the end of the minor time frame.

The worst-case latency unit 408 can ascertain a worst-case latency for one or more target messages that were available to be sent during one minor time frame, but were delayed due to lack of an available generic sporadic placeholder. For example, the worst-case latency unit 408 can identify a worst-case situation or scenario that includes having a target message blocked from being presented to the CAN bus by the most sporadic messages possible, which may include regenerated sporadic messages that can step ahead of the target message, and with the fewest number of generic sporadic placeholders to utilize. Example embodiments for the queuing delay in worst-case message latency determination will be described below in greater detail.

Schedule Development with Generic Sporadic Placeholders

Figure 5:
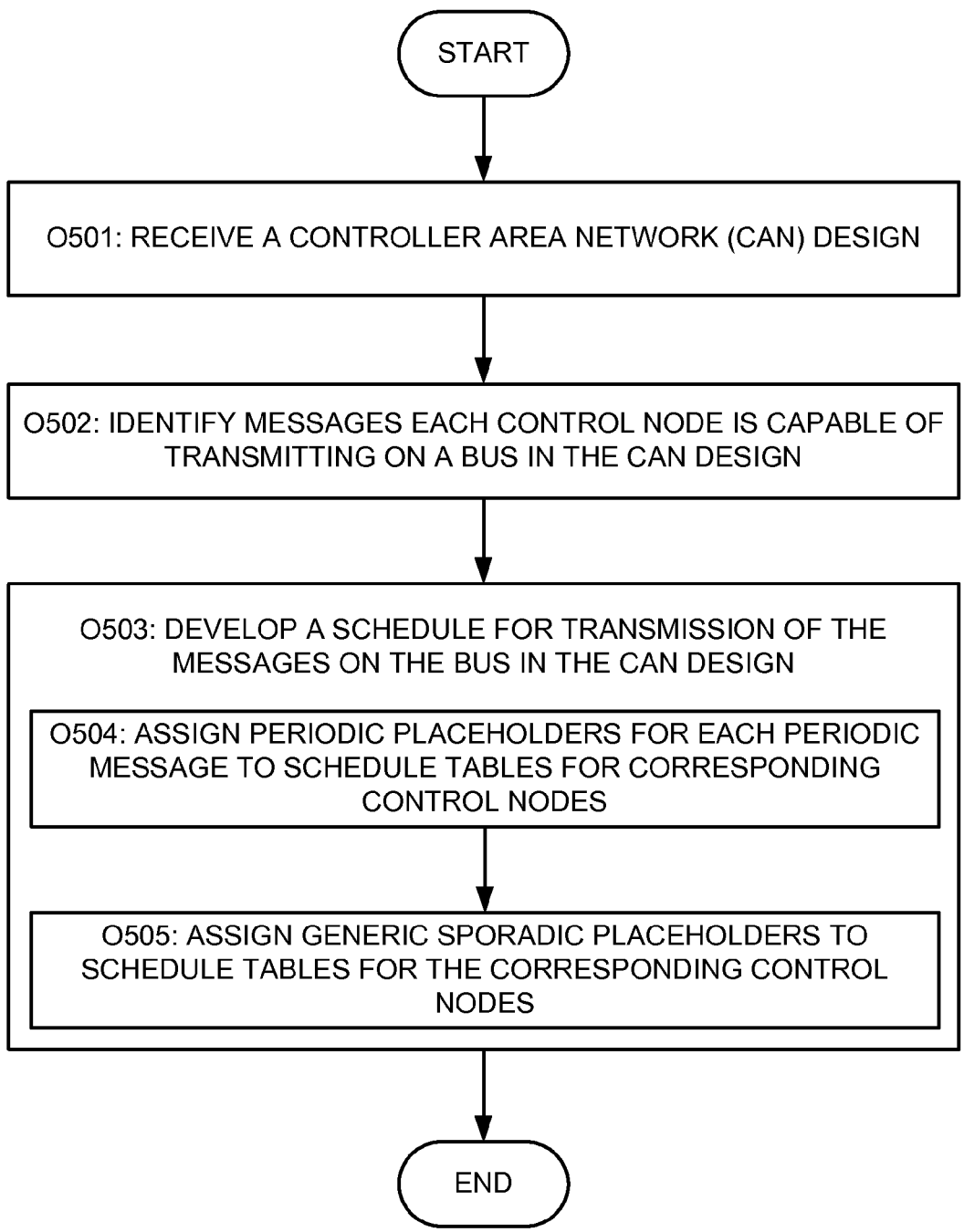
FIG. 5 illustrates a flowchart showing scheduling message transmission in a controller area network design according to various examples of the invention.

FIG. 5 illustrates a flowchart showing scheduling message transmission in a controller area network design according to various examples of the invention. Referring to FIG. 5, in a block 501, the controller area network design can be received. In some examples, the controller area network design can describe components and operations of a controller area network. In some embodiments, the controller area network design can be similar to the controller area network design 300 discussed above in FIG. 3.

The controller area network design can include parameters of the controller area network, such as an identification of CAN nodes in the controller area network design, or the like. The controller area network design can include parameters of the controller area network, such as an identification of messages available to be transmitted by each CAN node over the CAN bus in the controller area network design, for example, including information regarding the priority of the messages that can be sent from each CAN node, whether the messages are periodic or sporadic, message delivery timing, periodicity of periodic messages, minimum regeneration time for sporadic messages, or the like. The controller area network design can include parameters of the controller area network, such as an identification of the operation of the CAN bus, i.e., a frame period, a frame transmission time, minor time frame duration, or the like.

In a block 502, messages each CAN node can transmit on a CAN bus in the controller area network design can be identified. In some examples, parameters for each of the identified messages also can be determined from the controller area network design. For example, the message parameters can include the length of the messages, the delivery timing for the messages, whether the messages are periodic messages or sporadic messages, the periodicity for the periodic messages, the regeneration time of the sporadic messages, the priority of the messages, or the like.

In a block 503, a schedule for transmission of the messages on the bus in the controller area network design can be developed. For example, the messages and message parameters determined by the message discovery unit 404 can be utilized to populate schedule tables in the CAN nodes with placeholders. The placeholders can reserve bandwidth on the CAN bus for messages, for example, regardless of whether the CAN nodes utilize the bandwidth reservation to transmit a message.

In a block 504, periodic placeholders for each periodic message can be assigned to schedule tables for corresponding CAN nodes. The periodic placeholders can identify a particular periodic message for the CAN nodes to transmit on the CAN bus during a corresponding minor time frame.

In a block 505, generic sporadic placeholders can be assigned to schedule tables for corresponding CAN nodes. The generic sporadic placeholders can identify a group of sporadic messages for the CAN nodes to transmit on the CAN bus during a corresponding minor time frame. The CAN nodes, during operation, can present messages to the CAN bus in the controller area network design based on the configuration of their corresponding schedule tables. Although FIG. 5 shows the periodic placeholders being assigned to schedule tables before generic sporadic placeholders, in some embodiments, the periodic and generic sporadic placeholders being assigned to schedule tables in a common operation, or in reverse order.

Figure 6:
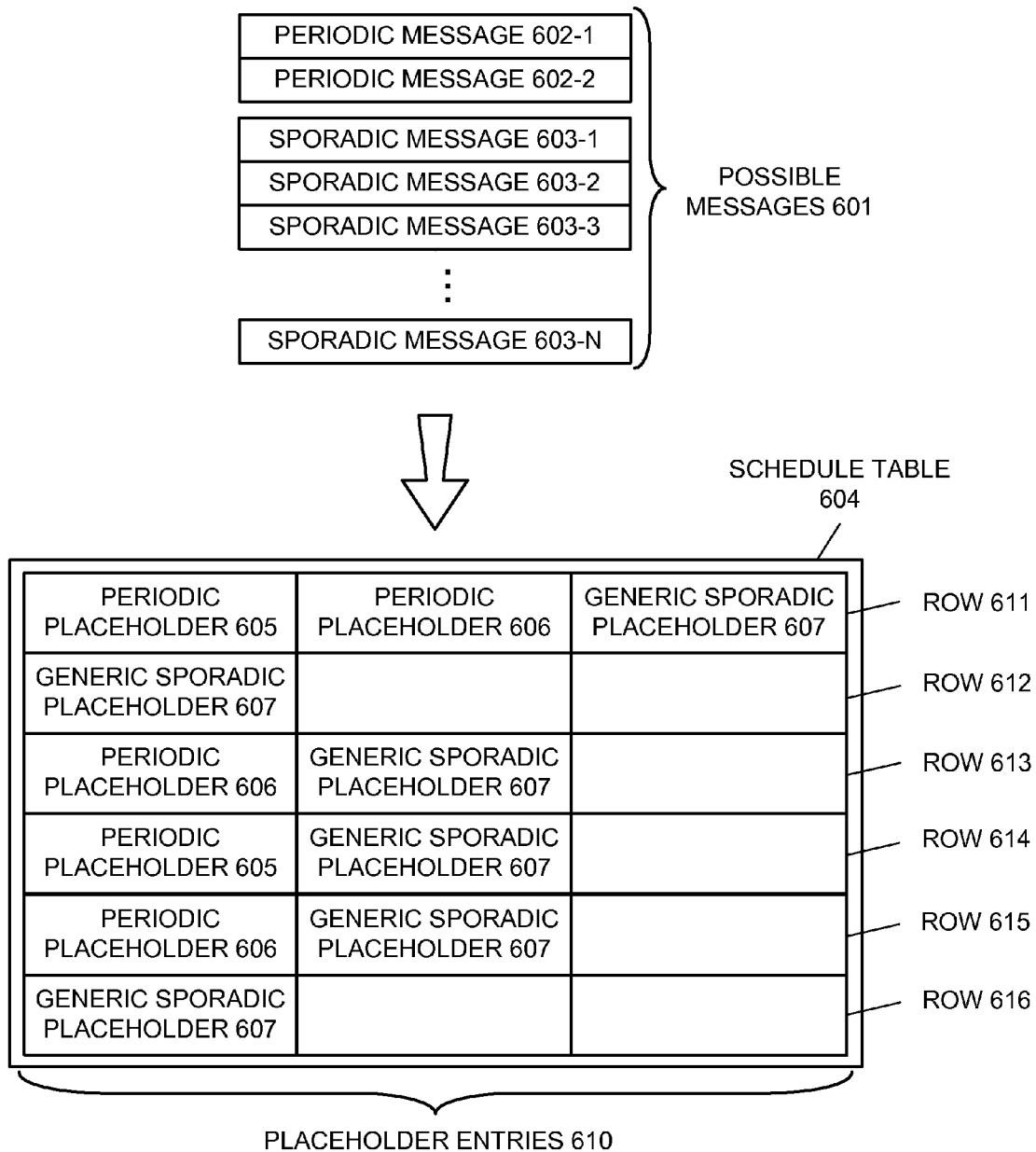
FIG. 6 illustrates an example flow diagram for development of a schedule table including generic sporadic placeholders according to various embodiments of the invention.

FIG. 6 illustrates an example flow diagram for development of a schedule table 602 including generic sporadic placeholders according to various embodiments of the invention. Referring to FIG. 6, a controller area network design tool can determine a group of possible messages 601 that a CAN node can be transmit over a CAN bus. The group of possible messages 601 can include periodic messages 602-1 and 602-2 and sporadic messages 603-1 to 603-N.

The controller area network design tool can utilize the group of possible messages 601, in some embodiments, along with parameters associated with the messages 601, to populate a schedule table 604 with placeholder entries 610. The parameters can include information regarding the priority of the messages that can be sent from each CAN node, whether the messages are periodic or sporadic, message delivery timing, periodicity of periodic messages, minimum regeneration time for sporadic messages, or the like.

The controller area network design tool can assign periodic placeholders 605 and 606 to the schedule table 604, for example, by determining the periodicity of the periodic message 602-1 and 602-2 and populating the schedule table 604 with placeholders 605 and 606 for each periodic message 602-1 and 602-2 based on that periodicity. In some embodiments, the periodic message 602-1 can have a periodicity corresponding to the minor time frames, and thus the controller area network design tool can populate every third row of the schedule table 604 with periodic placeholders 605. In this example, rows 611 and 614 can include periodic placeholders 605. Since the CAN node performs wrap-around execution of the schedule table 604—after utilizing the last row 616 of the schedule table 604, the CAN node can utilize the first row for the next minor time frame on the CAN bus—the periodic placeholders 605 can cover every periodic message 602-1 generated by the CAN node.

In some embodiments, the periodic message 602-2 can have a periodicity corresponding to two minor time frames, and thus the controller area network design tool can populate every other row of the schedule table 604 with periodic placeholders 606. In this example, rows 611, 613, and 615 can include periodic placeholders 606. Since the CAN node performs wrap-around execution of the schedule table 604—after utilizing the last row 616 of the schedule table 604, the CAN node can utilize the first row for the next minor time frame on the CAN bus—the periodic placeholders 606 can cover every periodic message 602-2 generated by the CAN node.

The controller area network design tool can assign generic sporadic placeholders 607 to the schedule table 604, for example, by determining parameters for the sporadic messages 603-1 to 603-N and populating the schedule table 604 with generic sporadic placeholders 607 available for any of the sporadic messages 603-1 to 603-N based on those parameters. The parameters of the sporadic messages 603-1 to 603-N can include information regarding when the sporadic messages 603-1 to 603-N may be available for transmission, a delivery time for the sporadic messages 603-1 to 603-N relative to arrival for the sporadic messages 603-1 to 603-N, a regeneration time for the sporadic messages 603-1 to 603-N, or the like.

Although FIG. 6 shows the schedule table 604 including generic sporadic placeholders 607 available to any of the sporadic message 603-1 to 603-N, in some embodiments, the generic sporadic placeholders 607 can be available to a subset of the sporadic message 603-1 to 603-N and the controller area network design tool can assign different sporadic placeholders (not shown) for the sporadic messages not included in the subset of sporadic messages.

Figure 7:
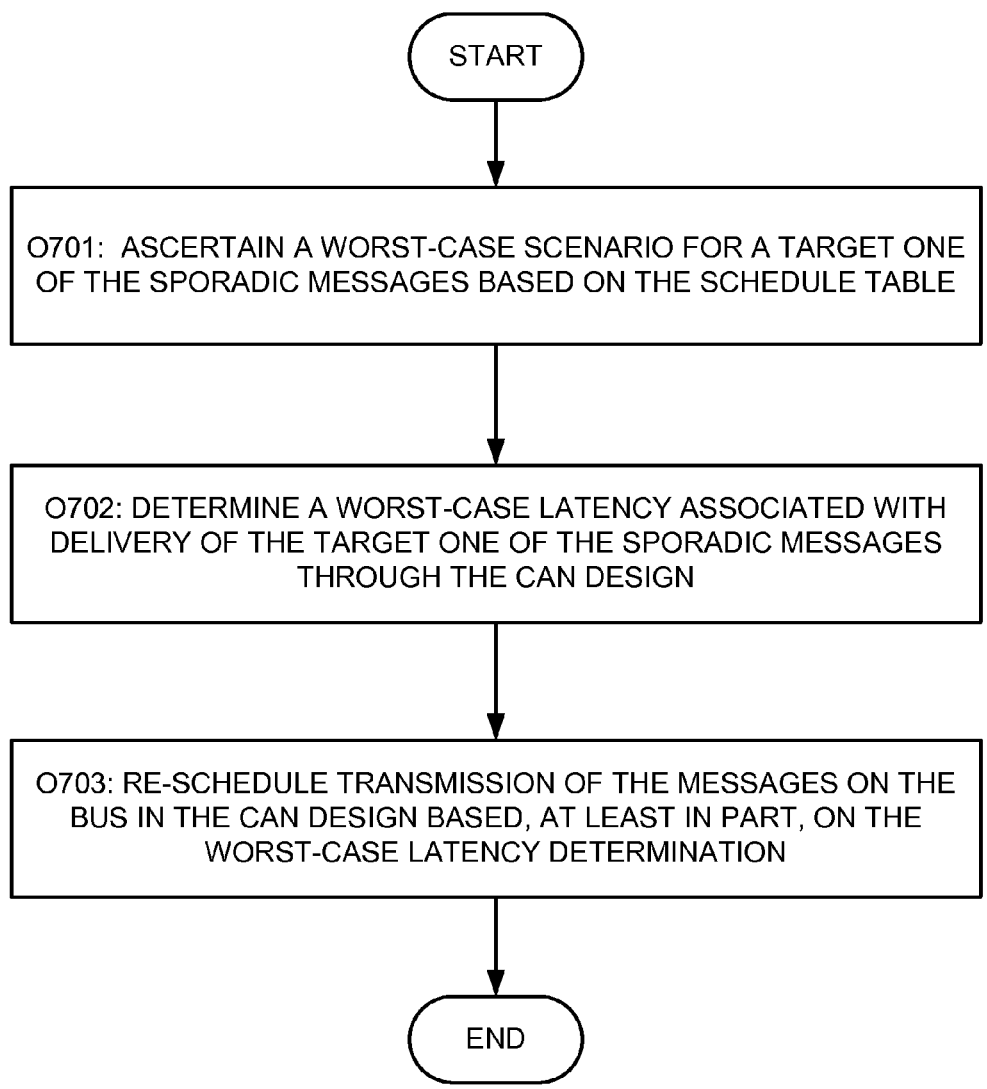
FIG. 7 illustrates a flowchart showing a worst-case latency determination for messages in a controller area network design according to various examples of the invention.

Worst-Case Message Latency Determination with Generic Sporadic Message Placeholders FIG. 7 illustrates a flowchart showing a worst-case latency determination for messages in a controller area network design according to various examples of the invention. Referring to FIG. 7, in a block 701, a controller area network design tool can ascertain a worst-case scenario for a target one of the sporadic messages based on the schedule table. In some embodiments, the worst-case scenario can occur when a CAN node has more sporadic messages to transmit during a minor time frame than available generic placeholders in a schedule table. The worst-case latency scenario can order all messages capable of being transmitted by the CAN node ahead of the target message, and optionally order messages in other CAN nodes coupled to the CAN bus, to maximize the delay for the target message in being transmitted over the CAN bus.

In a block 702, the controller area network design tool can determine a worst-case latency associated with delivery of the target one of the sporadic messages through the CAN design. The worst-case latency for the target message delivered through the controller area network can include several different delay time intervals including a generation delay, a queuing delay, a transmission delay, and a delivery delay. The generation delay can correspond to a time taken to generate of the message, for example, between the detection of an event by a sense device until the message is generated and provided to a controller for transmission to a destination CAN node over the CAN bus. The queuing delay can correspond to a time taken for the target message to gain access to the shared bus, which can include both a time for the target message to elevate in the queuing system of the CAN controller to be presented to the CAN bus and a time an arbitration time before the message gains access to the CAN bus. The transmission delay can correspond to a time taken for the target message to transmit on the shared bus to the destination CAN node. The delivery delay can correspond to a time taken for the destination CAN node to process the target message and deliver the target message to a destination endpoint device.

The controller area network design tool can calculate these various delays based on the worst-case scenario and determine the worst-case latency for the target message from the various delays. In some embodiments, the controller area network design tool can generate a message timing report for the controller area network design to identify timing metrics including the worst-case message latency during analysis of the controller area network design.

In a block 704, the controller area network design tool can re-schedule transmission of the messages on the CAN bus in the can design based, at least in part, on the worst-case latency determination. In some embodiments, the controller area network design tool can assign additional generic sporadic placeholders to the schedule table or re-locate current generic sporadic placeholders, which can allow for reduced queuing delay caused by lack of available bandwidth reservation in a minor time frame. The controller area network design tool can selectively group sporadic messages to certain placeholders, and introduce new sporadic placeholders corresponding sporadic messages not included in the group of sporadic messages. For example, the controller area network design tool can populate the schedule table with one or more specific sporadic placeholders for the target message, which can reserve bandwidth on the CAN bus for the transmission of the target message.

Figure 8A:
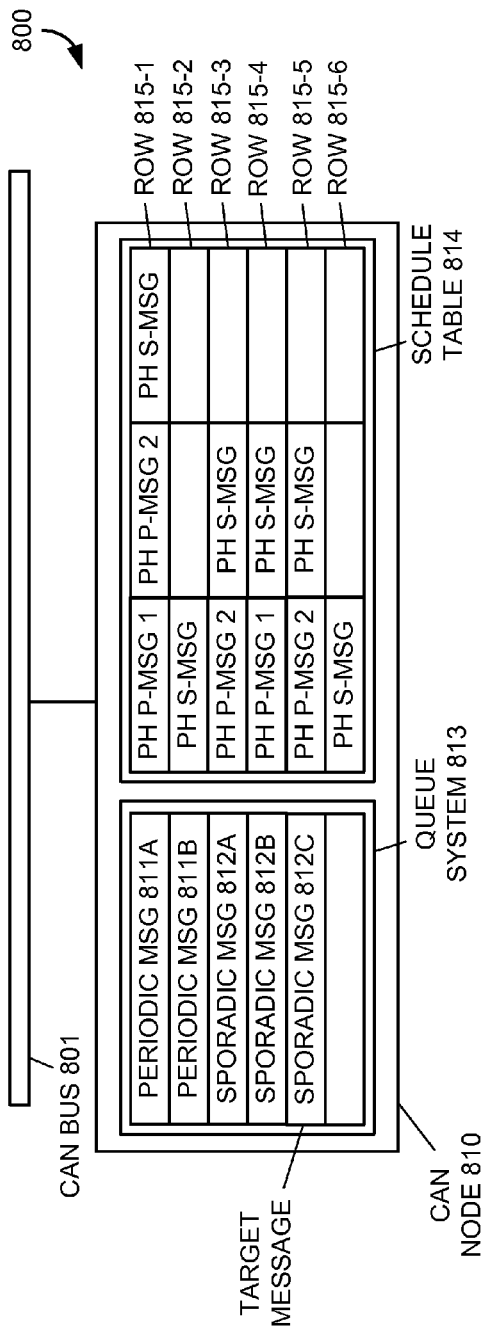
FIGS. 8A and 8B illustrate an example worst-case latency determination for messages in a controller area network design according to various embodiments of the invention.
Figure 8B:
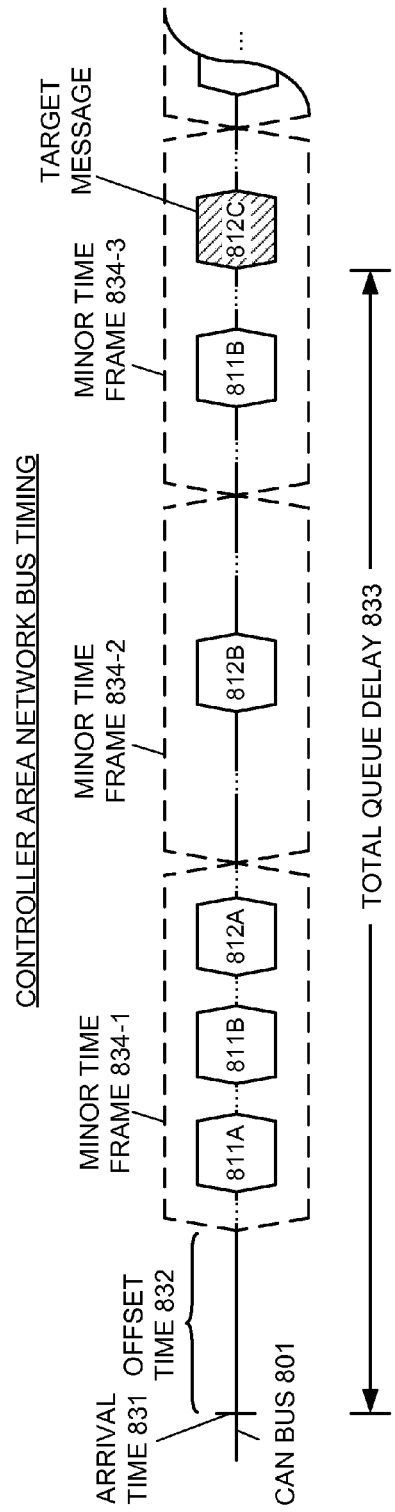

FIGS. 8A and 8B illustrate an example worst-case latency determination for messages in a controller area network design 800 according to various embodiments of the invention. Referring to FIGS. 8A and 8B, the controller area network design 800 can include a CAN node 810 to transmit messages 811A-811B and 812A-812C over a CAN bus 801. The CAN node 810 can include a queue system 813 to hold the messages 811A-811B and 812A-812C, and include a schedule table 814 having placeholders, which can allow the CAN node 810 to order the transmission of the messages 811A-811B and 812A-812C over the CAN bus 801. For a worst-case latency determination, the queue system 813 can be populated with the messages 811A-811B and 812A-812C in a worst-case order for a target message 812C, i.e., with as many possible messages ordered ahead of the target message 812C.

During analysis of this example controller area network design 800, the worst-case latency unit can populate the CAN node 810 with messages 811A-811B and 812A-812C in the worst-case order for the target message 812C and determine a total queue delay 833 between an arrival time 831 of the target message 812C, for example, when the queue system 813 receives the target message 812C or when the target message 812C was generated by the CAN node 810, and a time when the CAN node 810 gains access to the CAN bus 801 to transmit the target message 812C. This total queue delay 833 can include an offset time 832 between when the arrival time 831 of the target message 812C and a start of a next minor time frame 834-1 on the CAN bus 801, as well as time taken by transmitting other messages 811A-811B and 812A-812B on the CAN bus 801 before the target message 812C.

The CAN node 810 can utilize the schedule table 814 to determine when to present the messages 811A-811B and 812A-812C in the queue system 813 to the CAN bus 801 for arbitration. In this example, the CAN node 810 executes the first row 815-1 of the schedule table for the minor time frame 834-1. Since the first row 815-1 includes periodic placeholders PH P-MSG 1 and PH P-MSG 2, and a generic sporadic placeholder PH S-MSG, the CAN node 810 can transmit periodic message 811A corresponding to periodic placeholder PH P-MSG 1, periodic message 811B corresponding to periodic placeholders PH P-MSG 2, and sporadic message 812A corresponding to the generic sporadic placeholder PH S-MSG during the minor time frame 834-1. Although the CAN node 810 can transmit any of the sporadic messages 812A-812C based on the generic sporadic placeholder PH S-MSG, in the worst-case scenario, the CAN node 810 orders sporadic messages 812A and 812B ahead of the target message 812C, for example, based on their arrival times to the queue system 813, their relative priority levels, or the like.

The CAN node 810 can continue execution of the schedule table 814 and utilize the second row 815-2 of the schedule table for the minor time frame 834-2. Since the second row 815-2 includes a generic sporadic placeholder PH S-MSG, the CAN node 810 can transmit sporadic message 812B corresponding to the generic sporadic placeholder PH S-MSG during the minor time frame 834-2.

The CAN node 810 can continue execution of the schedule table 814 and utilize the third row 815-3 of the schedule table for the minor time frame 834-3. Since the third row 815-3 includes a periodic placeholder PH P-MSG 2 and a generic sporadic placeholder PH S-MSG, the CAN node 810 can transmit periodic message 811B corresponding to periodic placeholders PH P-MSG 2, and the target message 812C corresponding to the generic sporadic placeholder PH S-MSG during the minor time frame 834-3. In some embodiments, the worst-case scenario can populate the message queues of other CAN nodes in the controller area network design 800 to include any messages that could be transmitted during the minor time frame 834-3 having a greater priority than the target message 812C to maximize the arbitration delay on the CAN bus 801 for the target message 812C.

Figure 9A:
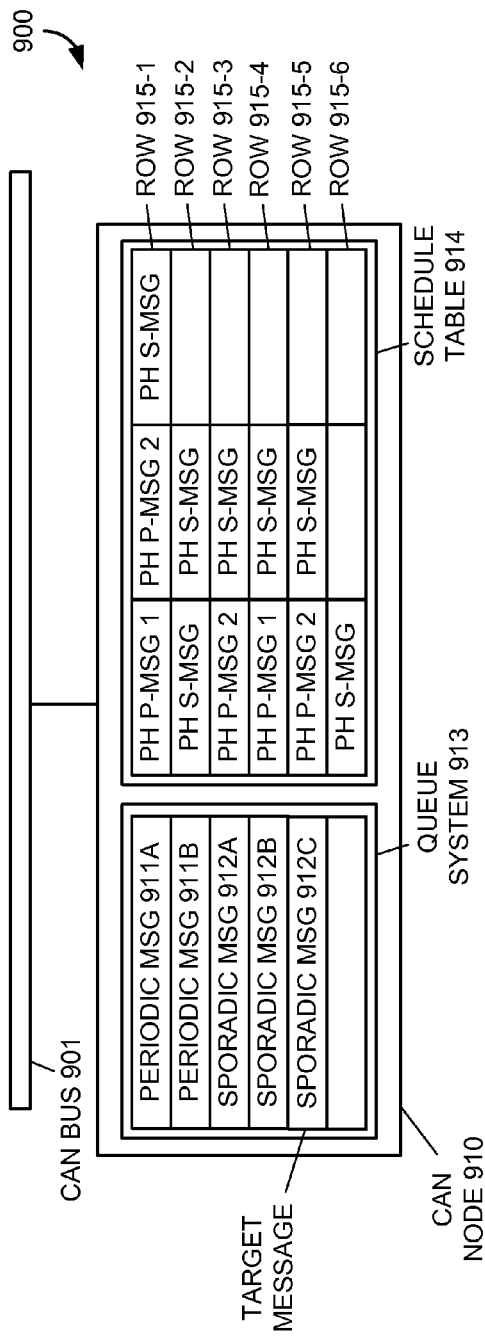
FIGS. 9A and 9B illustrate another example worst-case latency determination for messages in a controller area network design according to various embodiments of the invention.
Figure 9B:
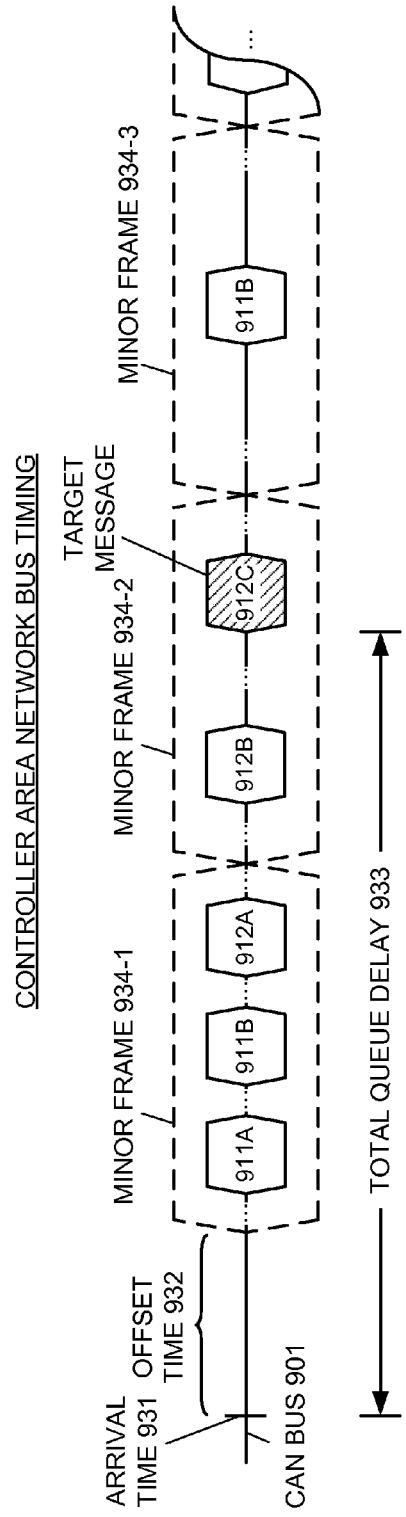

FIGS. 9A and 9B illustrate another example worst-case latency determination for messages in a controller area network design 900 according to various embodiments of the invention. Referring to FIGS. 9A and 9B, the controller area network design 900 can include a CAN node 910 to transmit messages 911A-911B and 912A-912C over a CAN bus 901. The CAN node 910 can include a queue system 913 to hold the messages 911A-911B and 912A-912C, and include a schedule table 914 having placeholders, which can allow the CAN node 910 to order the transmission of the messages 911A-911B and 912A-912C over the CAN bus 901. The schedule table 914 can be similar to the schedule table 814 in FIG. 8A, which can be adjusted to reduce the worst-case latency for a target message, for example, by adding a generic sporadic placeholder PH S-MSG in the second row 915-2.

For a worst-case latency determination, the queue system 913 can be populated with the messages 911A-911B and 912A-912C in a worst-case order for a target message 912C, i.e., with as many possible messages ordered ahead of the target message 912C. During analysis of this example controller area network design 900, the worst-case latency unit can populate the CAN node 910 with messages 911A-911B and 912A-912C in the worst-case order for the target message 912C and determine a total queue delay 933 between an arrival time 931 of the target message 912C, for example, when the queue system 913 receives the target message 912C or when the target message 912C was generated by the CAN node 910, and a time when the CAN node 910 gains access to the CAN bus 901 to transmit the target message 912C. This total queue delay 933 can include an offset time 932 between when the arrival time 931 of the target message 912C and a start of a next minor time frame 934-1 on the CAN bus 901, as well as time taken by transmitting other messages 911A-811B and 912A-912B on the CAN bus 901 before the target message 912C.

The CAN node 910 can utilize the schedule table 914 to determine when to present the messages 911A-911B and 912A-912C in the queue system 913 to the CAN bus 901 for arbitration. In this example, the CAN node 910 executes the first row 915-1 of the schedule table for the minor time frame 934-1. Since the first row 915-1 includes periodic placeholders PH P-MSG 1 and PH P-MSG 2, and a generic sporadic placeholder PH S-MSG, the CAN node 910 can transmit periodic message 911A corresponding to periodic placeholder PH P-MSG 1, periodic message 911B corresponding to periodic placeholders PH P-MSG 2, and sporadic message 912A corresponding to the generic sporadic placeholder PH S-MSG during the minor time frame 934-1. Although the CAN node 910 can transmit any of the sporadic messages 912A-912C based on the generic sporadic placeholder PH S-MSG, in the worst-case scenario, the CAN node 910 orders sporadic messages 912A and 912B ahead of the target message 912C, for example, based on their arrival times to the queue system 913, their relative priority levels, or the like.

The CAN node 910 can continue execution of the schedule table 914 and utilize the second row 915-2 of the schedule table for the minor time frame 934-2. Since the second row 915-2 includes two generic sporadic placeholders PH S-MSG, the CAN node 910 can transmit sporadic message 912B and the target message 912C corresponding to the generic sporadic placeholders PH S-MSG during the minor time frame 934-2. In some embodiments, the worst-case scenario can populate the message queues of other CAN nodes in the controller area network design 900 to include any messages that could be transmitted during the minor time frame 934-2 having a greater priority than the target message 912C to maximize the arbitration delay on the CAN bus 901 for the target message 912C.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Conclusion

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
utilizing, by a computing system, a controller area network (CAN) design to identify periodic messages and sporadic messages capable of being generated and transmitted on a shared bus by a control node described in the CAN design; and
assigning, by the computing system, placeholders to a schedule table of the control node to define a message transmission schedule for the control node, wherein the placeholders include a periodic message placeholder configured to identify a specific one of the periodic messages and reserve bandwidth on the shared bus for transmission of the identified periodic message, and wherein the placeholders include a sporadic message placeholder configured to identify a group of the sporadic messages and configured to reserve bandwidth on the shared bus for transmission of any one of the sporadic messages in the identified group.

2. The method of claim 1, further comprising determining, by the computing system, a worst-case latency associated with delivery of a first one of the sporadic messages on the shared bus when the control node utilized the sporadic message placeholder to transmit a second one of the sporadic messages on the shared bus.

3. The method of claim 2, wherein the first one of the sporadic messages has a lower priority than the second one of the sporadic messages.

4. The method of claim 1, wherein the periodic message placeholder configured to identify one of a plurality of the minor time frames available on the shared bus for the control node to transmit one of the periodic messages.

5. The method of claim 1, wherein the schedule table comprises multiple rows populated with the placeholders, each row corresponds to a different minor time frame available on the shared bus for the message transmission.

6. The method of claim 5, wherein at least one of the rows includes multiple place holders.

7. The method of claim 1, wherein the controller area network design complies with an ARINC 825 standard based on the placeholders populated in the schedule table of the control node.

8. An apparatus comprising at least one computer-readable memory device storing instructions configured to cause one or more processing devices to perform operations comprising:
utilizing a controller area network (CAN) design to identify periodic messages and sporadic messages capable of being generated and transmitted on a shared bus by a control node described in the CAN design; and
assigning placeholders to a schedule table of the control node to define a message transmission schedule for the control node, wherein the placeholders include a periodic message placeholder configured to identify a specific one of the periodic messages and reserve bandwidth on the shared bus for transmission of the identified periodic message, and wherein the placeholders include a sporadic message placeholder configured to identify a group of the sporadic messages and configured to reserve bandwidth on the shared bus for transmission of any one of the sporadic messages in the identified group.

9. The apparatus of claim 8, wherein the instructions are configured to cause the one or more processing devices to perform operations further comprising determining a worst-case latency associated with delivery of a first one of the sporadic messages on the shared bus when the control node utilized the sporadic message placeholder to transmit a second one of the sporadic messages on the shared bus.

10. The apparatus of claim 8, wherein the first one of the sporadic messages has a lower priority than the second one of the sporadic messages.

11. The apparatus of claim 8, wherein the periodic message placeholder configured to identify one of a plurality of the minor time frames available on the shared bus for the control node to transmit one of the periodic messages.

12. The apparatus of claim 8, wherein the schedule table comprises multiple rows populated with the placeholders, each row corresponds to a different minor time frame available on the shared bus for the message transmission.

13. The apparatus of claim 8, wherein the controller area network design complies with an ARINC 825 standard based on the placeholders populated in the schedule table of the control node.

14. A system comprising:
a memory system configured to store computer-executable instructions; and
a computing system, in response to execution of the computer-executable instructions, is configured to:
utilize a controller area network (CAN) design to identify periodic messages and sporadic messages capable of being generated and transmitted on a shared bus by a control node described in the CAN design; and
assign placeholders to a schedule table of the control node to define a message transmission schedule for the control node, wherein the placeholders include a periodic message placeholder configured to identify a specific one of the periodic messages and reserve bandwidth on the shared bus for transmission of the identified periodic message, and wherein the placeholders include a sporadic message placeholder configured to identify a group of the sporadic messages and configured to reserve bandwidth on the shared bus for transmission of any one of the sporadic messages in the identified group.

15. The system of claim 14, wherein the computing system, in response to execution of the computer-executable instructions, is further configured to determine a worst-case latency associated with delivery of a first one of the sporadic messages on the shared bus when the control node utilized the sporadic message placeholder to transmit a second one of the sporadic messages on the shared bus.

16. The system of claim 14, wherein the first one of the sporadic messages has a lower priority than the second one of the sporadic messages.

17. The system of claim 14, wherein the periodic message placeholder configured to identify one of a plurality of the minor time frames available on the shared bus for the control node to transmit one of the periodic messages.

18. The system of claim 17, wherein the schedule table comprises multiple rows populated with the placeholders, each row corresponds to a different minor time frame available on the shared bus for the message transmission.

19. The system of claim 17, wherein at least one of the rows includes multiple place holders.

20. The system of claim 14, wherein the controller area network design complies with an ARINC 825 standard based on the placeholders populated in the schedule table of the control node.

* * * * *